United States Patent
Waldie et al.

(10) Patent No.: US 9,737,097 B2
(45) Date of Patent: Aug. 22, 2017

(54) BODY-LOADING SUIT FOR THERAPEUTIC USES

(71) Applicant: Massachusetts Institute of Technology, Cambridge, MA (US)

(72) Inventors: James Murray Andrew Waldie, Camberwell (AU); Dava Jean Newman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 523 days.

(21) Appl. No.: 14/324,756

(22) Filed: Jul. 7, 2014

(65) Prior Publication Data

US 2014/0325726 A1   Nov. 6, 2014

Related U.S. Application Data

(63) Continuation of application No. 13/072,053, filed on Mar. 25, 2011, now Pat. No. 8,769,712.

(60) Provisional application No. 61/317,374, filed on Mar. 25, 2010.

(51) Int. Cl.
*A41D 13/00* (2006.01)
*B64G 6/00* (2006.01)

(52) U.S. Cl.
CPC ........... *A41D 13/0015* (2013.01); *B64G 6/00* (2013.01)

(58) Field of Classification Search
CPC ...... A41D 13/0015; A41D 15/00; B64G 6/00; B64D 10/00
See application file for complete search history.

(56) References Cited

U.S. PATENT DOCUMENTS

| | | | |
|---|---|---|---|
| 1,663,641 | A | 3/1928 | Smallwood |
| 2,097,376 | A | 10/1937 | Marshman |
| 3,081,459 | A | 3/1963 | Clark |
| 3,295,517 | A | 1/1967 | Stevens |
| 3,396,406 | A | 8/1968 | Gongwer |
| 3,419,003 | A | 12/1968 | Krauss et al. |
| 3,422,458 | A | 1/1969 | Schueller |
| 3,428,960 | A | 2/1969 | Schueller |
| 4,065,814 | A | 1/1978 | Fox |
| 4,089,065 | A | 5/1978 | McGee |
| 4,674,479 | A | 6/1987 | Jennings et al. |
| 4,910,802 | A | 3/1990 | Malloy |
| 4,923,741 | A | 5/1990 | Kosmo et al. |
| 5,091,247 | A | 2/1992 | Willibey et al. |
| 5,109,546 | A | 5/1992 | Dicker |
| 5,186,701 | A | 2/1993 | Wilkinson |
| 5,201,074 | A | 4/1993 | Dicker |

(Continued)

OTHER PUBLICATIONS

Waldie, James M. , "The Viability of Mechanical Counter Pressure Space Suits", Thesis Mar. 2005 , 189 pages (2 attachments).

(Continued)

*Primary Examiner* — Shaun R Hurley
*Assistant Examiner* — Andrew W Sutton
(74) *Attorney, Agent, or Firm* — Strategic Patents, P.C.

(57) ABSTRACT

An elastic skin suit simulates gravitational loading. By selecting material(s) of appropriate dimensions and appropriate moduli of elasticity, and optionally integrating inelastic portions to maintain a desired surface distribution, the suit can be adapted to impose a loading regime that simulates the loading of terrestrial gravity in a more continuous, shoulder-to-ankle manner than current loading suits.

20 Claims, 7 Drawing Sheets

(56) References Cited

U.S. PATENT DOCUMENTS

| | | |
|---|---|---|
| 5,308,305 A | 5/1994 | Romney |
| 5,318,018 A | 6/1994 | Puma et al. |
| 5,394,563 A | 3/1995 | Doyle |
| 5,537,686 A | 7/1996 | Krutz, Jr. et al. |
| 5,606,745 A | 3/1997 | Gray |
| 5,659,895 A | 8/1997 | Ford, Jr. |
| 5,659,898 A | 8/1997 | Bell, Jr. |
| 5,720,042 A | 2/1998 | Wilkinson |
| 5,737,772 A * | 4/1998 | Dicker ............... A41D 13/0015 2/115 |
| 5,737,773 A * | 4/1998 | Dicker ............... A41D 13/0015 2/115 |
| 5,745,917 A | 5/1998 | Dicker et al. |
| 5,778,452 A | 7/1998 | Dicker et al. |
| 5,820,534 A | 10/1998 | Vadher |
| 5,842,959 A | 12/1998 | Wilkinson |
| 5,857,947 A | 1/1999 | Dicker et al. |
| 5,860,944 A | 1/1999 | Hoffman |
| 5,867,826 A | 2/1999 | Wilkinson |
| 5,875,491 A | 3/1999 | Wilkinson |
| 5,960,474 A | 10/1999 | Dicker et al. |
| 5,978,966 A | 11/1999 | Dicker et al. |
| 6,000,059 A | 12/1999 | Abts |
| 6,047,405 A | 4/2000 | Wilkinson |
| 6,053,852 A | 4/2000 | Wilkinson |
| 6,176,816 B1 | 1/2001 | Dicker et al. |
| 6,450,943 B1 | 9/2002 | Crome et al. |
| 6,554,745 B2 | 4/2003 | Pham |
| 6,834,685 B2 | 12/2004 | Hannigan et al. |
| 6,890,288 B2 | 5/2005 | Bingham |
| 7,153,246 B2 | 12/2006 | Koscielny et al. |
| 8,083,644 B2 | 12/2011 | Purdy et al. |
| 8,544,114 B2 | 10/2013 | Williams et al. |
| 2002/0116743 A1 | 8/2002 | Tourbier et al. |
| 2002/0116744 A1 | 8/2002 | Tourbier et al. |
| 2005/0255775 A1 | 11/2005 | Sultan |
| 2007/0135278 A1 | 6/2007 | Grigoriev et al. |
| 2008/0110944 A1 | 5/2008 | Webb |
| 2009/0113596 A1 | 5/2009 | Young |
| 2009/0234265 A1 | 9/2009 | Reid, Jr. et al. |
| 2011/0231986 A1 | 9/2011 | Waldie et al. |

OTHER PUBLICATIONS

"Service Module Medical Operations (MO) Book 1 Reference Manuals SM", Sep. 25, 2000, 58 Pages.

Laing, Jennifer, "Putting The Pressure On", The Universe Today—Special Report: Putting the Pressure On Jennifer Laing interviews a young Australian (James Waldie) involved in new spacesuit design Posted Dec. 6, 2000 Dec. 6, 2000, 3 pages.

Benjamin, Bezaleel S., "Collection of Technical Papers—45th AIAA Aerospace Sciences Meeting 2007", Reno NV, USA Jul. 9, 2007, 1 page.

"U.S. Appl. No. 13/072,053, Notice of Allowance mailed Mar. 24, 2014", , 21 pages.

\* cited by examiner

BODY-LOADING SUIT FOR THERAPEUTIC USES

CROSS-REFERENCE TO RELATED APPLICATIONS

This application is a continuation of U.S. patent application Ser. No. 13/072,053 filed Mar. 25, 2011 (now U.S. Pat. No. 8,769,712), which claims the benefit of provisional application 61/317,374 filed Mar. 25, 2010, each of which is hereby incorporated by reference in its entirety.

FIELD OF INVENTION

This application relates generally to skin suits that cover a human body and more specifically to suits which simulate gravity loading on the human body.

BACKGROUND

During space flights and other extraterrestrial activity, exposure to low-gravity or zero-gravity environments can lead to harmful skeletal effects in the human body, particularly in the lower parts of the body and legs where the weight of the body would normally apply continuous loading. This may include a decrease in bone mineral content, bone mineral density, cross-sectional area, and structural strength that would otherwise be maintained under normal earth-bound loading and use. Thus, various techniques have been devised to reduce bone loss that might otherwise result from prolonged exposure to micro-gravity. For example, suits such as the Russian Pingvin suit try to address this problem by imposing vertical loading on a wearer using bungee cords. However, these suits are so physically uncomfortable that astronauts wearing them have been known to cut the bungee cords or otherwise circumvent the loading features during prolonged use. Other techniques such as exercise regimes, drugs, supplements, and the like have similarly met with limited success.

There remains a need for an improved gravity loading suit which helps to prevent bone loss and other harmful effects of microgravity environments.

SUMMARY

An elastic skin suit simulates gravitational loading. By selecting material(s) of appropriate dimensions and appropriate moduli of elasticity, and optionally integrating inelastic portions to maintain a desired surface distribution, the suit can be adapted to impose a loading regime that simulates the loading of terrestrial gravity in a more continuous, shoulder-to-ankle manner than current loading suits.

In one aspect, a device described herein includes a suit shaped and sized to a body of a user and formed of one or more panels of an elastic material, the elastic material having a first modulus of elasticity along a first axis within a plane of the elastic material and a second modulus of elasticity less than the first modulus of elasticity along a second axis within the plane of the elastic material, wherein the first modulus of elasticity is oriented toward a vertical axis of the body and the second modulus of elasticity is oriented toward a circumference around the body.

The device may include a yoke attached to a top of the suit to support the top upon a pair of shoulders of the user. The yoke may include a reinforced collar. The yoke may provide an initial gradation plane that begins a variable loading regime of the suit. The yoke may be formed of an inelastic material. The yoke may include a non-stretch fabric. The yoke may be formed of a second elastic material.

The device may include a pair of stirrups shaped to support a bottom portion of the suit about a pair of feet of the user. The pair of stirrups may be attached to a pair of shoes. Each one of the pair of shoes may include a rigid plate attached to one of the pair of stirrups. The pair of stirrups may include a non-stretch fabric. The pair of stirrups may be formed of the elastic material. The pair of stirrups may be adjustable in length. Each one of the pair of stirrups may include a mechanical coupling for attachment to one or more of a shoe, a vibration therapy device, and an exercise device.

The device may include one or more fasteners on a bottom portion of the suit to removably and replaceably attach the bottom portion of the suit to a footing. The footing may include one or more of a pair of feet, a pair of shoes, and an exercise device.

The suit may be a body-fitting suit shaped to cover and contact an external surface of the body from below an armpit region to above an ankle region.

The device may include one or more strips of inelastic material extending from a top of the suit to a bottom of the suit, each of the one or more strips secured to the suit at two or more predetermined locations. The one or more strips of inelastic material may be secured to an inelastic yoke attached to a top portion of the suit and a pair of stirrups on the bottom of the suit, whereby the elastic material of the suit is secured in a desired distribution about the body when the suit is in use. The one or more strips of inelastic material may include a strip of inelastic material along each side of the suit that extends from an armpit region of the suit to an outside ankle region of the suit. The two or more predetermined locations may include positions spaced within three centimeters of one another along each of the one or more strips of inelastic material. The two or more predetermined locations may include two or more positions spaced at about twenty millimeters. The one or more strips of inelastic material may follow one or more respective paths from the top of the suit to the bottom of the suit selected for minimal dynamic loading of the suit when the user of the suit is in motion. The one or more strips of inelastic material may follow one or more respective paths selected for minimal mobility hindrance.

The device may include at least one strip of inelastic material extending from a location within the suit to one of a top edge and a bottom edge of the suit. The at least one strip of inelastic material may include a strip from the top edge along a back center of the suit. The device may include a strip of inelastic material along an inseam of the suit, the strip secured to the suit at two or more inseam locations.

The elastic material may extend from a top of the suit to a bottom of the suit. The suit may progressively increase an axial loading toward a lower portion of the body. The axial loading may be about one G of force at a bottom of the suit. The axial loading on the user of the suit at any vertical point between an armpit region and an ankle region may approximate a loading at that point when the user is standing in a one G environment.

The first modulus of elasticity may be substantially orthogonal to the second modulus of elasticity. The elastic material may be a fabric woven from elastic fibers, wherein a first plurality of elastic fibers in a warp of the elastic material have a substantially greater modulus of elasticity than a second plurality of elastic fibers in a weft of the elastic material.

The device may include a zipper permitting the suit to open for donning and doffing. The device may include a shape memory alloy within the suit, the shape memory alloy controllable to expand the suit for donning and doffing. The device may include an electro-active polymer within the suit, the electro-active polymer controllable to expand the suit for donning and doffing. The elastic material may include a lamination of a plurality of material types. The elastic material may include a woven material formed of a plurality of warp fibers and a plurality of weft fibers having different moduli of elasticity. At least one of the plurality of warp fibers and the plurality of weft fibers may include a plurality of fibers having different fiber moduli of elasticity in different locations, thereby providing a variable modulus of elasticity in at least one direction within the elastic material. The elastic material may include a polymer.

The suit may include one or more gripping points to facilitate donning or doffing of the suit. The one or more gripping points may include at least one of a loop, a tab, and a knob shaped and sized to be gripped by a human hand. The suit may include at least one zipper for donning and doffing. The at least one zipper may separate the suit into two or more separate pieces. The device may include a pair of shoes attached to a bottom of the suit. The pair of shoes may include reinforced soles. The pair of shoes may distribute a load from the bottom of the suit substantially equally across a bottom of feet of the user. The pair of shoes may distribute a load from the bottom of the suit in a manner that does not exert rotational force on feet of the user.

The device may include one or more attachment points on the suit for a restraint system. The restraint system may include a system for at least one of working in a low gravity environment, sleeping in the low gravity environment, and exercising in the low gravity environment.

In another aspect, a device disclosed herein includes a yoke shaped to rest securely about a pair of shoulders of a user; a pair of stirrups shaped to receive a pair of feet of the user; and a suit having a top coupled to the yoke and a bottom coupled to the pair of stirrups, the suit shaped and sized to conform to a body of the user with sufficient skin pressure to prevent slippage from a desired distribution on the user, and the suit formed of one or more panels of an elastic fabric having a substantially different modulus of elasticity for each of a warp and a weft, the elastic fabric oriented within the suit to provide a progressively increasing vertical loading from the top of the suit to the bottom of the suit when worn by the user whereby the vertical loading reaches about one G at the bottom of the suit when worn by the user.

The progressively increasing vertical loading may be substantially equivalent to a loading for the body of the user when standing in a one G environment. The device may include one or more inelastic strips attached at predetermined locations along a length of the suit, the one or more inelastic strips securing the elastic fabric in the desired distribution about the body when the suit is worn by the user.

In another aspect, a method for simulating gravitational loading on a body disclosed herein includes: fabricating a suit to fit the body from an elastic material with two moduli of elasticity wherein a first modulus of elasticity is greater than a second modulus of elasticity and wherein the elastic material is oriented with the first modulus of elasticity along an axial direction of the body, the suit sized to cover at least a torso portion and a leg portion of the body; and placing the suit on the body.

In another aspect, a method for fabricating a suit that simulates gravitational force disclosed herein includes: obtaining a plurality of measurements from a body of a user; identifying a desired loading scheme for the body including at least a desired simulated gravitational load of a body suit and a surface pressure of the body suit on the body; determining a plurality of characteristics for an elastic fabric including a first modulus of elasticity for a warp of the elastic fabric, a second modulus of elasticity for a weft of the elastic fabric, and a coefficient of friction between the elastic fabric and the body of the user; calculating a distribution of the elastic fabric to achieve the desired loading scheme, thereby providing a plurality of circumferential lengths of the elastic fabric; creating a pattern for one or more panels of the elastic fabric by subtracting each one of the plurality of circumferential lengths from a generic body suit pattern to obtain the distribution of the elastic fabric for the desired loading scheme; and printing the pattern for use in creating the one or more panels from a sheet of the elastic fabric.

The method may include cutting the sheet of the elastic fabric according to the pattern. The method may include assembling the one or more panels into the body suit. The method may include attaching a pair of stirrups to the body suit. The method may include attaching a yoke to the body suit. The method may include attaching a non-stretch ribbon periodically to the elastic fabric along a side of the suit. Obtaining the plurality of measurements from the body of the user may include three-dimensionally scanning the body. Obtaining the plurality of measurements from the body of the user may include acquiring the plurality of measurements in digital form. Obtaining the plurality of measurements may include obtaining a plurality of circumference measurements from the body. Obtaining the plurality of measurements may include obtaining a plurality of radial measurements from the body. Obtaining the plurality of circumference measurements may include obtaining measurements spaced apart no more than one centimeter along a length of the body. Obtaining the plurality of measurements may include obtaining a height measurement from an armpit of the body to an ankle of the body. Obtaining the plurality of measurements may include obtaining one or more of a body type and a body weight for the body.

Various features, aspects, and advantages of various embodiments will become more apparent from the following further description.

BRIEF DESCRIPTION OF THE DRAWINGS

The following detailed description may be understood by reference to the following figures wherein.

DETAILED DESCRIPTION

As described herein, an elastic skin suit may be designed and used for simulating gravitational loading. It will be understood that while simulated gravitational loading is one useful application, the general principle of distributing a load over a body of a user may have a wide variety of useful applications such as physical therapy, therapeutic use during prolonged bed rest, strength conditioning, and so forth. It should also be understood that the gravity loading suit described below generally seeks static loading that is independent of a wearer's physical position; however, therapeutic uses of a loading suit may apply dynamic loading that varies according to the position of legs, arms, torso, and so forth, such as by imposing resistance to muscles or bone only when a limb is extended or in some other position. All such variations that would be apparent to one of ordinary skill in the art are intended to fall within the scope of this invention.

Figure 1:
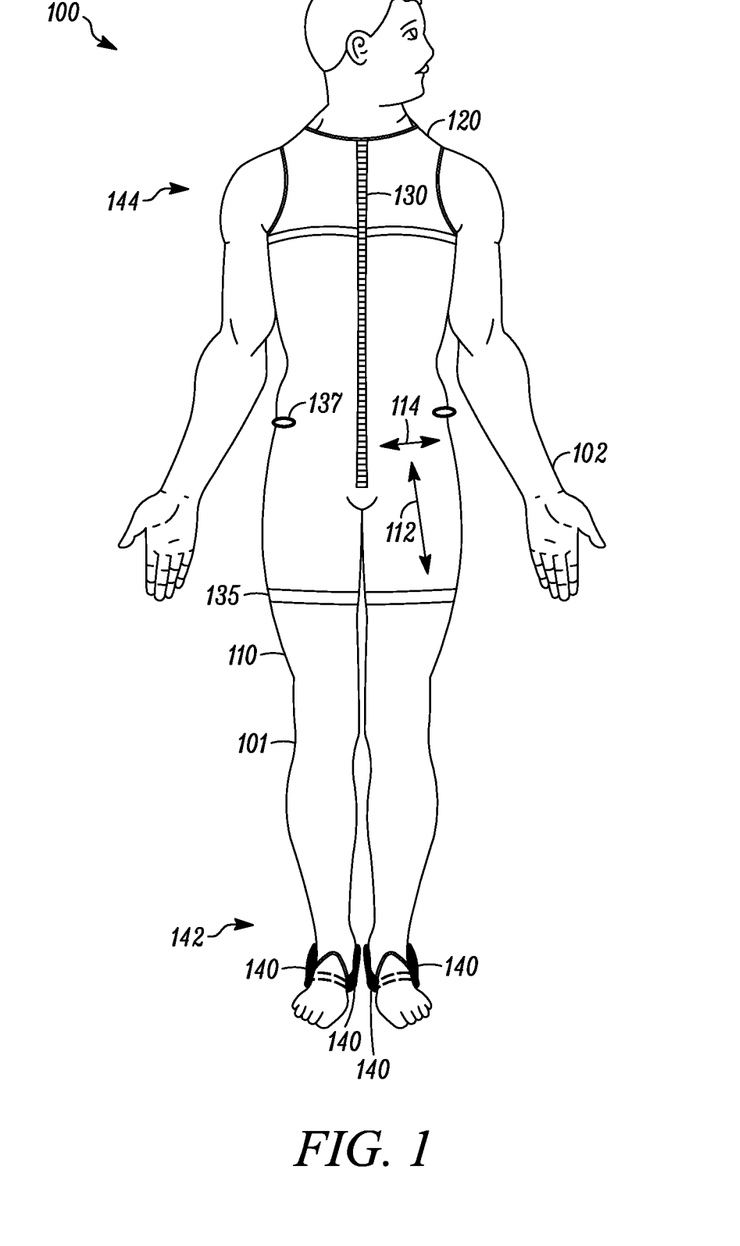
FIG. 1 shows a gravity loading suit on a human body.

FIG. 1 shows an elastic suit on a human body. A suit 100 may fit over a human body 102, and be shaped and sized to the body of a user, such as to provide a desired level of pressure (or lack thereof) on the skin. The suit 100 may have a body portion 110 which covers most of the torso and most of the legs of the body. The suit 100 may be formed from a material 101 having two differing moduli of elasticity in different directions, e.g., the x and y directions within the plane of the material 101, or along some other axes within the plane of the material 101. The first modulus may be substantially orthogonal to the second modulus, such as where the material 101 is formed from a woven material with warp threads and weft threads having different moduli, or the two moduli may be placed in more or other orientations relative to one another, such as by integrating reinforcing fibers with different elasticity in various locations within the material 101. It will be appreciated that materials with different orthogonal moduli of elasticity are conveniently and commercially available, such as super stretch or two way stretch heavy weight Nylon Spandex available from numerous fabric suppliers. On the other hand, fabrics with more diverse or complex spatially varying moduli may also be advantageously employed to provide a suit designer with more control over the overall loading provided by the suit. It will also be understood that while the suit 100 of FIG. 1 is depicted as sleeveless, sleeves of any desired length may be included for warmth, comfort, or other loading, therapeutic, and/or other functions. The elastic suit may be designed of materials that are durable and robust for use during extended space flight or other application.

The first modulus of elasticity 112 may be greater than the second modulus of elasticity 114, and may be oriented along the long axis of the body, that is vertically or substantially parallel to a center axis of the body when the body is in a standing position as shown in FIG. 1. Thus for example the vertical modulus, which applies simulated gravity loading, may be about ten times greater than the horizontal (or circumferential) modulus, which yields to distribute material in a skin-tight manner about a wearer's body. It will be understood that while this ratio has empirically served well in gravity loading suits, the ratio may be greater (e.g., at least fifteen times greater) or lesser (e.g., less than five times greater), or may vary across the suit so that the ratio is different in different regions of the suit, all without departing from the scope of this disclosure. This relatively higher vertical modulus may serve to load the body of a wearer in a corresponding, axial orientation, that is, vertically from head to toe (or more precisely, from armpit to ankle as discussed in greater detail below). The second modulus of elasticity 114 may be oriented within the material 101 of the suit 100 such that the second modulus of elasticity is oriented circumferentially, i.e., around a circumference of the body. To the extent that this circumferential orientation lies in a horizontal plane, this orientation is also referred to herein as horizontal, although it will be understood that the planar surface of the suit material intersects this horizontal plane rather than forming the horizontal plane. As noted above, the second module of elasticity 114 may be lower than the first modulus so that the suit can more freely expand circumferentially to accommodate the body of the wearer.

The material 101 may extend from a top 144 of the suit 100 to a bottom 142 of the suit. It will be appreciated that the described alignment of moduli is not precise, and that with a stretchable fabric formed to a body, the actual alignment of fibers within a material will vary from location to location during use. Thus as described herein, a vertical or circumferential alignment of a modulus in the material 101 is intended to describe a general orientation of characteristics of the material 101, which may vary across different locations within the suit 100 or panels of material within the suit 100, rather than a precise alignment of the dual-modulus material 101 in the suit 100.

Figure 2:
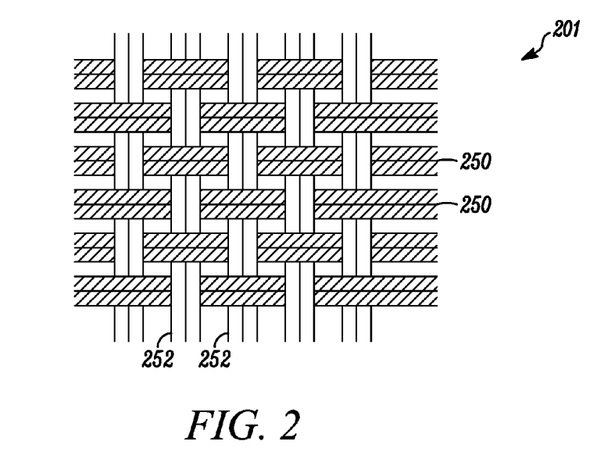
FIG. 2 shows a woven fabric.

As shown in FIG. 2, the material 201, such as any of the materials described above, may be a woven material or fabric created from elastic fibers, wherein a first plurality of elastic fibers 252 in a warp of the fabric have a substantially greater modulus of elasticity than a second plurality of elastic fibers 250 in a weft of the fabric. This fabrication technique tends to orient the moduli orthogonal to one another; however, other weaving techniques are known and may be employed to achieve various orientations of fibers in the material 201. In other embodiments, the material 201 may include a lamination of a plurality of material types, such as to obtain multiple, varying moduli in various directions within the material 201, or different numbers of fibers in the vertical and horizontal directions.

The material 201 may include a woven material formed of a plurality of warp fibers and a plurality of weft fibers having different moduli of elasticity, such as to provide a fabric with a modulus that varies according to location within the fabric, thereby providing a spatially customized fabric having a designer-specified modulus at each warp/weft intersection within the material 201. Thus at least one of the plurality of warp fibers and the plurality of weft fibers may include a plurality of fibers having different fiber moduli of elasticity in different locations (e.g., different on a fiber-by-fiber basis, rather than different on a warp v. weft basis), thereby providing a variable modulus of elasticity in at least one direction within the elastic material. The elastic material may include a polymer. While not depicted, it will be understood that the modulus may be controlled using any of a variety of techniques. For example, this may include multiple layers each reinforced in one direction, or this may include laminating or otherwise securing individual fibers within the material 201 to increase the modulus in any number of desired orientations. This latter approach further permits relatively arbitrary orientation of fibers along any desired curvilinear paths within the material 201.

The suit may be formed from a single piece of material with two moduli of elasticity. Alternatively, numerous pieces of material (either the same type of material or different types of material) may be cut and sewn together or otherwise assembled (e.g., using tape, adhesives, welding, or any combination of the forgoing) to form the suit. The numerous pieces may be cut to fit a body based on, e.g., a circumference around the torso or around the leg where the material piece is to be used as part of the suit. The numerous pieces may also be sized to provide progressively greater pressure toward the lower portions of the body thereby simulating gravitational loading.

In general, the fibers used within the material of the suit may be formed from any material or combination of materials suitable for achieving the elastic characteristics described herein. A variety of materials formed from yarns of nylon, polyester, polyamide, spandex, acrylic, cotton, wool, and combinations of the foregoing, as well as numerous other natural and man-made fibers are known in the art for use in elastic clothing and may be adapted to use with the gravity loading suit described herein.

Figure 3:
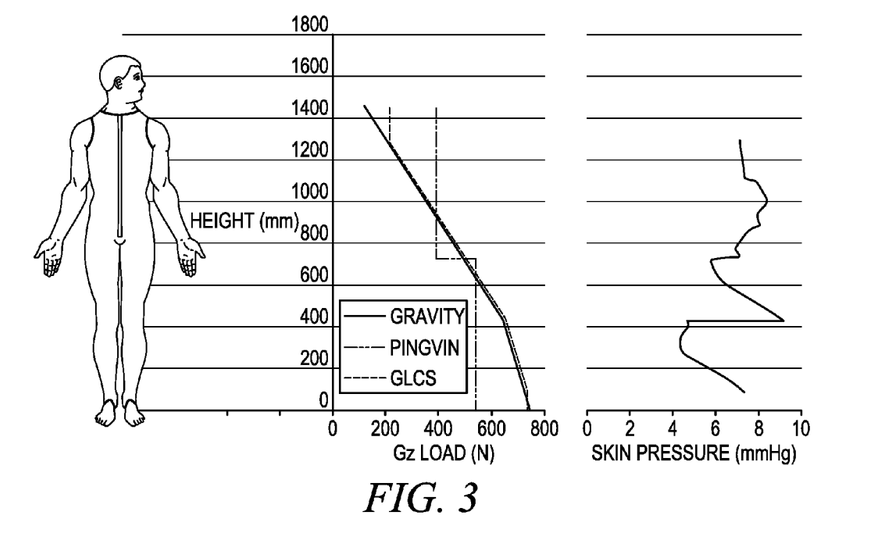
FIG. 3 shows a loading regime of a gravity loading suit.

FIG. 3 shows a loading regime of a gravity loading suit. The suit described herein may progressively increase an axial loading toward a lower portion of the body, toward an axial loading of about one G of force at a bottom of the suit. The axial loading on a user at any vertical point (or vertical plane) between an armpit region and an ankle region may approximate a loading at that point when the user is standing in a one G environment. As used herein, a "one G environment" or "one G loading" is generally intended to refer to the typical gravitational loading experienced by a person when standing on the surface of the earth. It will be readily appreciated that this load is negligible at a top of the person (e.g., the top of the head) where there is no mass above to be supported, and gradually increases as the body is traversed downward toward the feet which, at their bottom, support the full one G load for the body.

The suits described herein may not exactly reproduce a one G load for a user. For example, the loading regime may vary as portions of the body move and change shape during ordinary use. Further, the body suit described herein does not generally permit variable loading above the armpits (where a shoulder yoke may support the suit at an initial loading plane at the top of the suit) or below the ankles, where stirrups or the like are used to secure a terminal loading plane at each ankle, even though these extremities contribute to a true one G loading of a body. Nevertheless, subject to these and similar physical limitations of the suit, it will be understood that the suit generally achieves a substantially one G loading of a body of a wearer as though the wearer were standing in a one G environment. Thus, the suit provides an improved simulation of gravitational loading when compared to prior art such as the Russian Pingvin suit even under conditions where the suit fails to exactly and completely reproduce the affects of gravity on a user. This features is illustrated in FIG. 3, which provides a comparison of loading due to gravity, loading with the suit described herein, and loading with the prior art Pingvin suit.

Returning to FIG. 1, the suit 100 may be formed of one or more panels or other separate sections of elastic material. Each panel may be stitched, taped, welded, glued or otherwise attached to adjacent panels to achieve a desired shape for the suit. The elastic material may have a first modulus of elasticity 112 along a first axis within a plane of the material 101 and a second modulus of elasticity 114 less than the first modulus of elasticity 112 along a second axis within the plane of the material 101. The first modulus of elasticity 112 may be oriented along a vertical axis of the body (that is, along an axis traveling substantially from head to foot, or vertically along a body in a standing position) and the second modulus of elasticity 114 may be oriented toward a circumference around the body. The suit may be a body-fitting suit shaped to cover and contact the external surface of the body from below an armpit region to above an ankle region.

The material 101 may be sized to apply sufficient surface pressure to a wearer's skin so that a coefficient of friction between the suit 100 and the skin maintains the material 101 in a desired distribution about the body, such as to preserve a desired loading regime, to prevent the suit 100 from bunching in portions, and so forth. By maintaining a desired distribution of the suit 100 about a body, the suit may be designed and used to progressively and gradually increase axial loading (e.g., vertical loading for a standing body) from the shoulders to the feet in a manner that simulates gravitational loading.

A yoke 120 of an inelastic material such as canvas or the like may optionally be used to retain the material 101 of the suit 100 at a top 144 of the suit 100. The yoke 120 may be shaped to rest securely about a pair of shoulders of a user, and may reach from just below the armpits to the top of the shoulders. The yoke 120 may be formed of any suitable inelastic material, such as a non-stretch fabric. The yoke 120 may also or instead include an elastic material, such as the material 101 of the suit 100 or some other material. While this approach may reduce the number of separate material sheets used in making the suit 100 by integrating the yoke 120 into the suit material, it will also be appreciated that a non-elastic material can advantageously define a fixed loading plane (transverse to the torso) at the top of the material 101, which may simplify loading calculations when designing the suit to impose a desired loading regime. More generally, the yoke 120 may be attached to the top 144 of the suit 100 (or form the top of 144 of the suit 100) in any suitable manner to support the top 144 upon a pair of shoulders of the user. The yoke 120 may include a reinforced collar to resist chaffing of the collar during donning and doffing. As noted above, the yoke 120 may usefully provide an initial gradation plane or loading plane that begins a variable loading regime of the suit.

The neck line of the suit may be a v-neck, a crew neck, or any other suitable shape.

The suit 100 may optionally include at least one zipper for donning and doffing. The zipper 130 may be a front zipper from the neck line to the crotch area of the suit, or the zipper 130 may traverse all the way from the neck line on the front of the suit through the crotch area to the neck line on the back of the suit so that the suit may be separated in to a left and right half. More generally, the zipper 130 may be positioned in any manner so that the suit 100 can separate into two or more separate pieces. Zippers may also or instead be provided on the leg portions or on the sides of the suit, again to aid in donning and doffing of the suit or to provide a port or opening during use. It will be understood that a wide variety of mechanisms are known that may be used instead of or in addition to the zipper 130 to provide for repeated opening and closing of portions of the suit. This includes without limitation Velcro, buttons, snaps, clasps, buckles, straps, and so forth, as well as a variety of different zipper types, any of which may be adapted for use in a suit as described herein.

The suit 100 may include a shape memory alloy 135 such as copper-zinc-aluminum-nickel, copper-aluminum-nickel, or nickel-titanium, within the suit. The shape memory alloy may be controllable to expand the suit for donning and doffing. For example, the shape memory alloy may have a one-way shape memory that, when heated to a transition temperature, expands the elastic material 101 of the suit 100 to provide ample clearance for insertion/removal of limbs, torso, etc. The suit 100 may include an electro-active polymer within the suit 100 that is controllable to expand the suit 100 for donning and doffing. More generally, a variety of shape memory polymers are known, including shape memory polymers that can be activated to return to an original form with an application of electricity, light or other stimulus or energy. Still more generally, a variety of so-called smart materials are known that can change shape with an application of stress, temperature, moisture, pH, electricity, or magnetism, any of which may be adapted to use as the shape memory alloy 135 to expand a suit for donning and doffing as described herein, provided the material also has a state suitable for use in gravity loading body suit or similar item as described herein.

It will be appreciated that while the shape memory alloy 135 is depicted as bands of material near the top of the legs, the shape memory alloy 135 may be disposed in any suitable location and form that can assist in donning, doffing, or otherwise handling and using the suit 100. This may, for example, include multiple bands of material disposed at various locations on an outside or inside surface of the suit 100, or as fibers woven into the material 101 at suitable locations.

The suit 100 may have stirrups 140 attached to the lower portion of the suit, or any other apparel or attachment means suitable for securing the bottom 142 of the suit 100 in a substantially fixed location at or near the feet or more generally a lower extremity of the wearer. The stirrups 140 may go around each foot of a wearer to hold the suit 100 in position and, when the material 101 of the suit 100 is supported between the stirrups 140 and yoke 120 in use, apply simulated gravitational loading to a wearer. The stirrups 140 may be fabricated from a non-stretch or inelastic fabric. Alternatively, the stirrups 140 may be formed of elastic material. The pair of stirrups 140 may be adjustable in length. The stirrup or other mechanisms may also be adjustable to modify the load on the body of the wearer. The adjustment may also be used to compensate for changes in height of the body of the wearer. The load may be adjusted based on differing gravity environments. The load may be adjusted so that load may be applied or removed while the suit is being worn. The load may also be adjusted to compensate for any loss of elasticity in the skin suit material over time.

In another aspect, the stirrups 140 may be fabricated of hard material which may be attached to shoes, boots, socks, or the like. A pair of stirrups 140 may be shaped to support a bottom portion of the suit 100 about a pair of feet of the user, or about footwear worn by the user. The stirrups 140 may be adapted to attach to pedals, platforms or plates on exercise equipment or the like. The bottom 142 of the suit 100 may also or instead include one or more fasteners, clasps, snaps, Velcro patches, hooks, or the like to removably and replaceably attach the bottom 142 of the suit 100 to a footing. The footing may, for example, include a pair of feet (i.e., the wearer's feet), a pair of shoes, an exercise device, or any other suitable location or device to which feet might be secured. The footing may include one or more plates (either within footwear of the user or external to any such footwear) that vibrate the soles of the feet in order to apply vibration therapy to prevent loss of bone mass.

In some embodiments, each one of the pair of stirrups 140 may include a mechanical coupling for attachment to a shoe, a vibration therapy device, an exercise bike, or any other exercise device or other device that a user might usefully anchor to. An exercise treadmill may also or instead use straps attached to hip sections of the suit 100, which may usefully incorporate a mating attachment point so that a user can be secured to the treadmill in a microgravity environment. Alternatively, a harness or the like may be incorporated into the suit 100, or detachably integrated into the suit via a separate zipper or the like for attachment and removal. The suit 100 may include one or more attachment points 137 for a restraint system, such as a system working in a low gravity environment, sleeping in a low gravity environment, and/or exercising in a low gravity environment. The suit 100 may include a pair of shoes permanently or removably and replaceably attached to the bottom 142 of the suit 100. The pair of shoes may include reinforced soles or any other suitable arrangement to distribute a load from the bottom of the suit 100 (as applied by the suit 100) substantially equally across a bottom of the feet of a user. The pair of shoes may be designed to distribute a load from the bottom 142 of the suit 100 in a manner that does not exert rotational force on feet of the user, such as with straps or other supports that balance the loading force of the suit between the heel and the toe.

A body suit as described herein may also or instead be adapted for therapeutic use(s). Generally, a suit with two moduli of elasticity may be formed to aid in holding limbs or other portions of a body in a preferred position, or urging the body into the desired position by applying greater force and/or directional force when out of position. Thus the suit's mechanical loading can be used to develop muscles or bone structure in beneficial patterns. For example, cerebral palsy may be treated with an elastic suit adapted to aid in locomotor control along with postural development and voluntary movement control. The elastic suit may also or instead be adapted to aid in postural development and weight bearing. In such therapeutic uses, the elastic suit may advantageously be worn under outer garments such as conventional clothing. Other therapeutic or rehabilitative uses will be readily appreciated, and the suit described herein may be adapted to a variety of such applications without departing from the scope of this disclosure.

It will also be appreciated that the suit may be adapted for a variety of different gravity environments. Thus for example, a suit may be adapted to provide a loading regime closer to one G for an astronaut on the Moon, Mars, or some other reduced-gravity environment, or the suit may be adapted for a zero-gravity (or near-zero-gravity) environment such as a space station or a travelling space ship. All such variations as would be apparent to one of ordinary skill in the art are intended to fall within the scope of this disclosure.

It will be understood that the suit 100 may optionally include some, all or none of the various features described above such as zippers, stirrups, a yoke, and so forth, all without departing from the scope of this disclosure. Thus for example, in one aspect a suit disclosed herein includes a yoke shaped to rest securely about a pair of shoulders of a user, a pair of stirrups shaped to wrap around a bottom of a pair of feet of the user, and a top coupled to the yoke and a bottom coupled to the pair of stirrups. The suit may be shaped and sized to conform to a body of the user with sufficient skin pressure to prevent slippage from a desired distribution on the user, which desired distribution maintains a desired loading regime for the user. The suit may be formed of one or more panels of an elastic fabric having a substantially different modulus of elasticity for each of a warp and a weft, such as the woven fabric illustrated above in FIG. 2. The elastic fabric may be oriented within the suit to provide a progressively increasing vertical loading from a top of the suit to a bottom of the suit when worn by the user whereby the vertical loading reaches about one G at the bottom of the suit when worn by the user. The progressively increasing vertical loading may be substantially equivalent to a loading for the body of the user when standing in a one G environment.

In general, the suit applies a pressure or normal force to the skin, which helps to prevent slippage and to maintain the material 101 of the suit 100 in a physical distribution to achieve the desired gravity (or therapeutic) loading. This pressure may be controlled or used for additional benefits. For example, the elastic skin suit may be used as a countermeasure for post-flight orthostatic intolerance. During space flight, body fluids may redistribute equally around the body. The brain becomes accustomed to the increased cranial blood pressure associated with these redistributed fluids. Upon return to Earth and normal gravitational force, body fluids are again pulled downwards thereby starving the brain of the blood pressure to which it has become accustomed. Fainting may result. The elastic skin suit may be used to apply mild compression on the torso and legs. This pressure may resist downward fluid flow and help prevent fainting upon return to Earth. The elastic skin suit and its associated pressure on the torso and legs may be helpful to prevent post-flight orthostatic intolerance by use of the suit after the spaceflight is completed while the body adjusts to being back on Earth.

Figure 4:
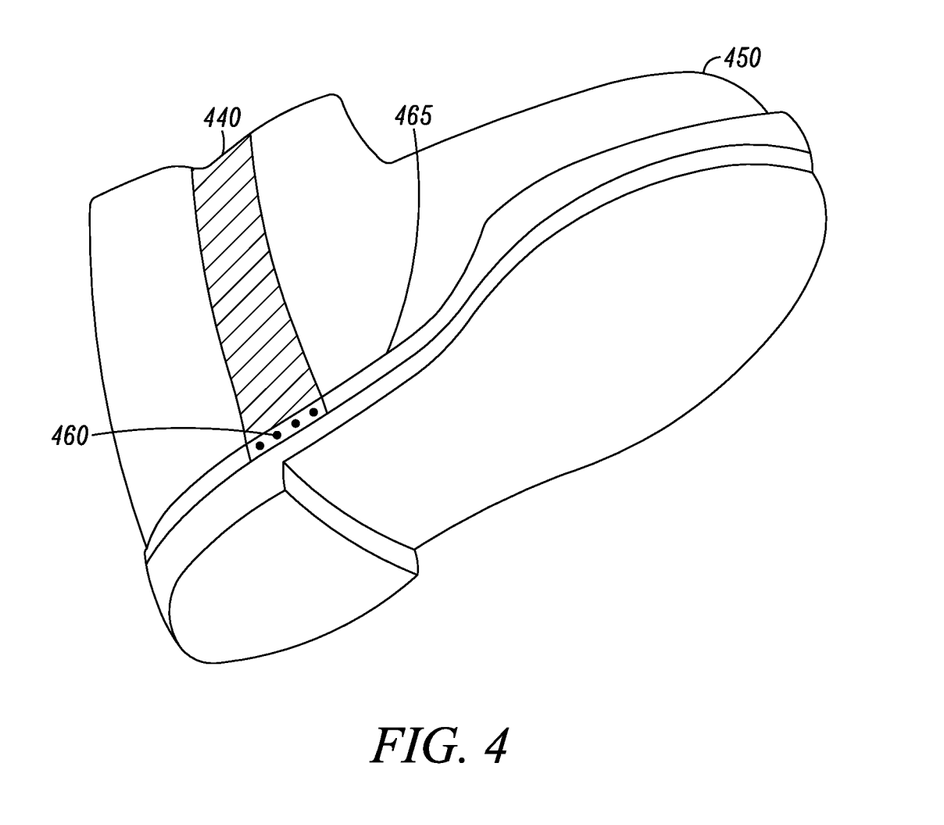
FIG. 4 shows a shoe for use with a body suit.

FIG. 4 shows a shoe for use with a gravity loading suit. The shoe 450 may cover, enclose, or otherwise engage a foot. In general, the shoe 450 may be incorporated into the suit, or fabricated with attachments points for removably and replaceably attaching the shoe 450 to the suit, or the shoe 450 may be shaped and sized (e.g., with grooves, slots or the like) to fit into a stirrup of the suit. While the footwear of FIG. 4 is illustrated as a shoe, it will be readily appreciated that any other footwear might suitably be adapted for use with the suit described herein, including without limitation boots, sandals, socks, sneakers, and so forth.

A stirrup 440 may attach the shoe 450 to a gravity loading body suit (not shown). In general, the shoe 450 or other footwear may attach at one, two, three, or more attachment points to the suit. A plate 465 may be included as part of the shoe 450 to provide rigid support beneath the wearer's foot and to distribute the pressure applied by the suit across the bottom of the foot. Thus each one of a pair of shoes for a suit may include a rigid plate attached to one of a pair of stirrups on each leg of the suit.

One or more attachments 460 may be provided to attach the stirrup 440 to the shoe 450 (or the plate 465 in the shoe 450). The attachments 465 may include screws, bolts, staples, adhesives, clips, snaps or other connectors that permanently or removably couple the stirrup 440 to the shoe 450. It will be understood that a variety of attachment systems may be employed to permanently or removably and replaceably interconnect the stirrup 440 and the shoe 450. For example, the stirrup 440 may be attached to the suit and shaped and sized to fit around the shoe 450, engaged to the shoe for example in a groove, slot, or the like, or to connect to the shoe 450 at an attachment point as noted above. The stirrup 440 may instead be permanently affixed to the shoe 450 and removably and replaceably connectable to the suit. In other embodiments, both the shoe 450 and the suit may have an attachment point, and the stirrup 440 may be one or more adjustable-length attachment bands with mating attachment points to releasably connect to the shoe 450 and the suit. The attachments 465 may include clips or other quick-release mechanisms so that the suit can be detached from the shoe 450 or other footing when desired, such as during donning and doffing of the suit.

It will be appreciated that the stirrups 440 (or other direct or indirect physical coupling between a bottom of the suit and a foot of the wearer) may apply a substantial force to the foot consistent with a one G loading regime. In general, the form of connection between the suit and the foot is preferably configured so that no torque is applied about an ankle of the wearer that would tend to flex, extend, or otherwise bias the foot when the suit is in use.

Figure 5:
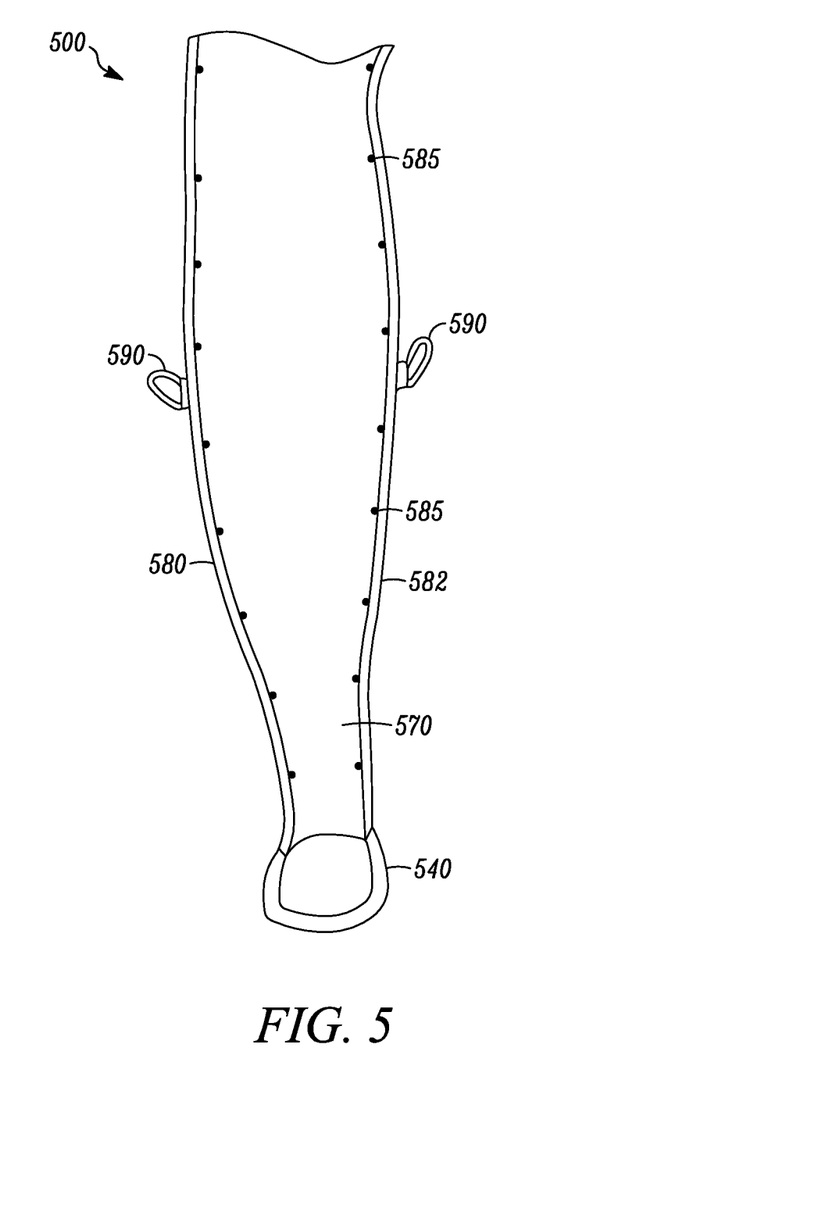
FIG. 5 shows a leg portion of a gravity loading suit.

FIG. 5 shows a leg portion of an elastic suit. The leg portion 500 of the suit may include elastic material 570, such as any of the fabrics, laminates, or other materials described above. The elastic material 570 may be attached to a stirrup 540 which may go around a foot, sock, or shoe. The stirrup may attach to a shoe or the like to secure a bottom of the suit to a foot. The stirrup may also, or instead, be formed of the elastic material 570.

In general, an inelastic material 580 may be attached to the elastic material 570 at various locations to secure the elastic material 570 in a desired distribution about a wearer's body, and to prevent the elastic material 570 from stretching or shifting when the suit is in use. The inelastic material 580 may be formed as one or more strips, sheets, or the like that inelastically define paths from the top of the suit to the bottom (or any regions in between). Thus for example, a strip 582 of the inelastic material 580 may be secured relative to a wearer's body by directly attaching to and spanning the distance between stirrups at a bottom of the suit and a yoke at a top of the suit. While the elastic material 570 may tend to stretch, contract, bunch, or otherwise shift during movement by a wearer, the inelastic material 580 may maintain a generally fixed relationship to the wearer's body.

The elastic material 570 may be attached to the inelastic material 180 at any number of locations using adhesives, stitching, snaps, clasps, or any other suitable fastening technique. So for example a strip 582 of the inelastic material 580 may be attached to the elastic material 570 at two or more points 585 along its length using, e.g., stitching, contact adhesive, or any other suitable technique that provides sufficient bonding between the two materials to hold them together during normal use (including donning and doffing) of the suit. The strip 582 may be incorporated into a seam of the suit, or as an aesthetic trim or the like. The strip 582 may be attached to the elastic material 570 at regular intervals, such as every ten millimeters or so along its length.

It will be understood that one or more such strips may be distributed in a variety of patterns over a body suit. This may, for example, include paths that extend from a top to a bottom of the suit, paths that traverse a surface of the suit such as the inseam, paths that start on an edge of the suit (e.g., connected to the yoke at the top, or a stirrup on the bottom) and terminate away from an edge (e.g., in the small of the back), or any other useful path covering locations where the suit might usefully be secured to a strip or other section of inelastic material. It will also be appreciated that two or more paths may be interconnected so as to provide circumferential (around a circumference of the body) and/or axial (parallel to a vertical, central axis of the body) attachment points as desired.

By way of example and not limitation, a strip 582 may be placed on the outside of the leg. A strip 582 may be positioned along an inseam of the body suit, the strip secured to the suit at two or more inseam locations. A strip 582 may interconnect a stirrup to the yoke (e.g., under the armpit). A strip 582 may traverse from the waist area of the back of the suit to the neckline. A strip 582 may traverse through the crotch region of the suit. It will be appreciated that in some cases, longer paths may be separated into a number of shorter, disjoint segments to accommodate user mobility or the like without departing from the scope of this disclosure.

One or more strips 582 of inelastic material 580 may follow one or more respective paths from a top of the suit to a bottom of the suit selected for minimal dynamic loading of the suit when a user of the suit is in motion, i.e., loading substantially independent of body position. The strip 582 may, for example, be positioned along one of the outside edges of the torso and leg to follow a path on the body that does not significantly change in length during physical movement. When thus properly positioned, the strip 582 coupling the shoulders (via a yoke) and feet (via stirrups or the like) with a fixed-length of inelastic material should not significantly impact the loading regime as a body goes through various movements of the legs and torso. One or more strips 582 of inelastic material 580 may also or instead follow one or more respective paths selected for minimal mobility hindrance.

The strip 582 may be formed of non-stretchable ribbon in patterns along the neutral side-axis of the torso or legs as described above. The ribbon may form an inseam of the suit, or any other seam where panels of elastic material are joined. The ribbon may be approximately five millimeters in width, or any other suitable width. One or more strips 582 may extend from a top of the suit to a bottom of the suit, with each of the one or more strips 582 secured to the suit at two or more predetermined locations. In one aspect, the one or more strips of inelastic material may be secured to an inelastic yoke attached to a top portion of the suit and a pair of stirrups on a bottom of the suit, whereby the elastic material of the suit is secured in a desired distribution about the body when the suit is in use. The one or more strips of inelastic material may include a strip 582 of inelastic material 580 along each side of the suit that extends from an armpit region of the suit to an outside ankle region of the suit. The two or more predetermined locations where the strip 582 is attached to the elastic material 570 may include positions spaced within three centimeters of one another along each of the one or more strips 570, or any other regular or irregular intervals along the strip 582, according to a desired degree of control over movement of the elastic material 570. The two or more predetermined locations may for example include two or more positions spaced at about twenty millimeters or any other suitable spacing. The suit may include at least one strip 582 of inelastic material 580 extending from a location within the suit (i.e., away from an edge such as the neckline, yoke, foot openings, arm openings, and so forth) to an edge such as the top edge or one of the bottom edges of the suit. A strip 582 of inelastic material 580 may extend from the top edge along a back center of the suit. In general, each strip 582 may be attached at predetermined locations along a length of the suit such that the strip 582 secures the elastic fabric in a desired distribution about the body when the suit is worn by the user.

In some embodiments, one or more grippers 590 may be attached to the suit. The suit may include any number of such gripper 590, which may include loops, tabs, or any other similar gripping points, in order to facilitate donning or doffing of the suit by providing locations where a wearer can easily grasp the otherwise skin-tight fabric of the suit. The gripper(s) 590 may be conveniently located along the ribbons of inelastic material described above, such as on the leg portions or the torso portions or elsewhere on the suit. The gripper(s) 590 may include at least one of a loop, a tab, a knob or any other protrusion shaped and sized to be gripped by a human hand.

Figure 6:
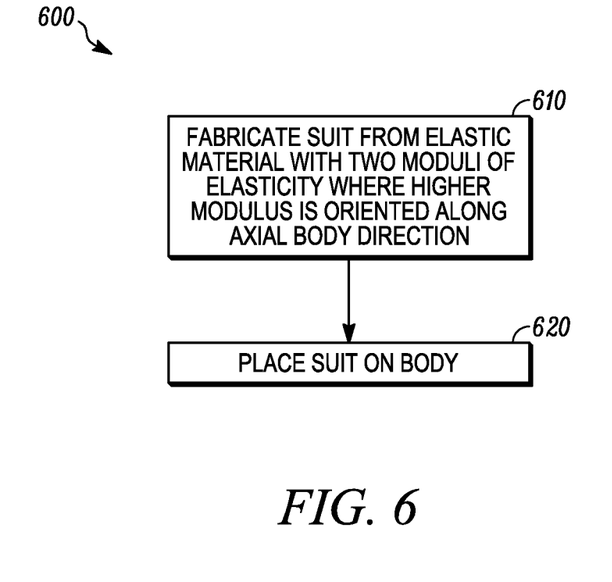
FIG. 6 is a flowchart of a process for using a suit to simulate gravitational loading on a human body.

FIG. 6 is a flowchart of a process for using a suit to simulate gravitational loading on a human body. In general, the process 600 or method for simulating gravitational loading includes fabricating a suit tailored to a specific user, such as any of the suits described above, and then donning the suit by the specific user to impose a desired gravitational load onto the body of the user.

The process 600 begins with fabricating a suit from an elastic material with two moduli of elasticity (step 610). Details of the suit are provided above. A number of the features a repeated here by way of illustration and not limitation. One modulus of elasticity may be higher than a second modulus of elasticity, as generally discussed above. Fibers having the first modulus of elasticity may be oriented along the axial direction of the body. Fibers having the second modulus of elasticity may be oriented in the lateral direction of the suit. The fabricated suit may include one or more zippers, a shoulder yoke, stirrups, one or more inelastic strips oriented in the axial direction of the body, and loops or grippers for aiding in donning and doffing of the suit.

By donning a suit that has been fabricated for a user, the user can experience a simulated gravitational load. Alternatively stated, simulating gravitational loading on a body may be accomplished by placing a suit on the body (step 620), the suit being fabricated to fit the body from an elastic material that has two different moduli of elasticity in two different directions. In general, the suit may be shaped and sized to cover at least a torso portion and a leg portion of the body. By placing the suit on the body, the higher modulus of elasticity along the axial direction of the body can impose mechanical loading, while the lower modulus of elasticity around the circumference can secure the suit to the body in a skin-tight manner while permitting expansion and contraction of the suit that might occur, e.g., during breathing, muscle flexion, and so forth. For a one G loading regime in a zero-gravity environment, the loading imposed by the suit may increase from top to bottom, reaching approximately one G of loading at or near the bottom of the body.

Figure 7:
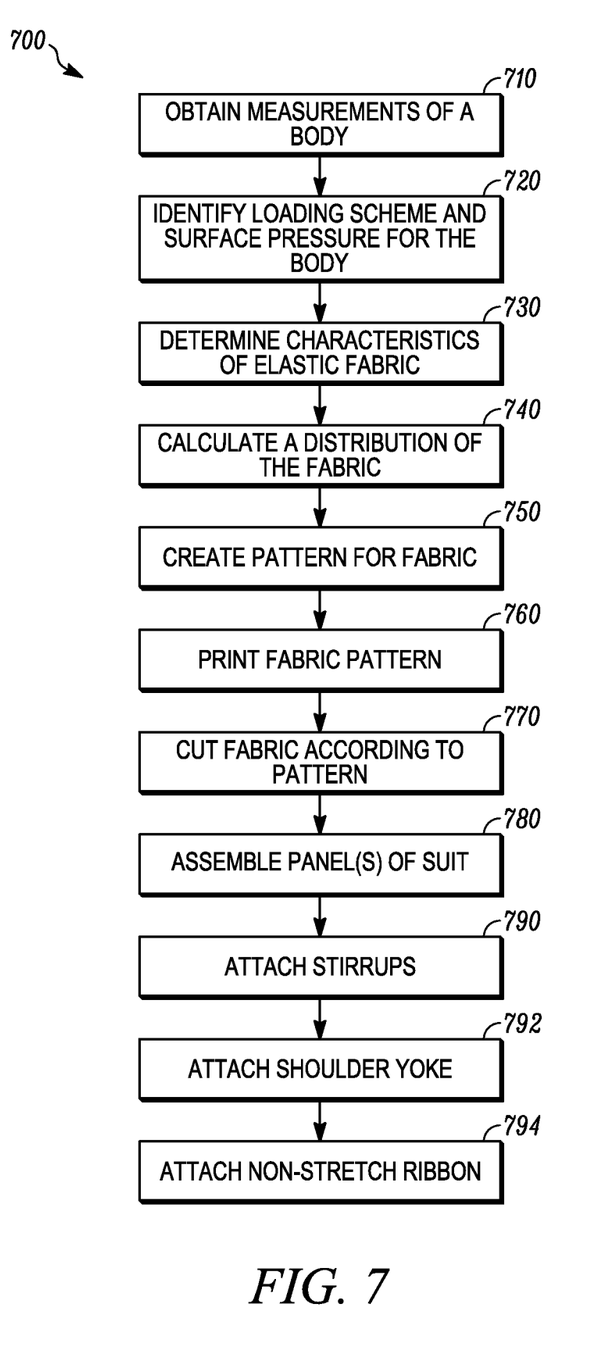
FIG. 7 is a flowchart of a process for fabricating a suit that simulates gravitational loading.

FIG. 7 is a flowchart of a process for fabricating a suit that simulates gravitational loading.

As shown in step 710, the process 700 may begin with obtaining a plurality of measurements from a body of a user. A variety of techniques may be used to capture length-based measurements such as body length or circumference. In one aspect, the measurements may be manually obtained using a tape measure or the like, and entered into a computer for storage and subsequent processing. In another aspect, an automated device may be used to obtain any number of circumferential and/or lengthwise measurements. In another aspect, measurements may be inferred from one or more two-dimensional images of a body. In another aspect, the process 700 may include three-dimensionally scanning the body to obtain three-dimensional surface data, which may in turn be used to obtain any desired surface measurements such as linear measurements of height or circumference of the body. A variety of three-dimensional imaging techniques are known in the art and may be suitable adapted to obtaining body measurements as described herein. In addition to length measurements, a variety of other body measurements and other relevant data may be obtained from a user in order to fabricate an appropriate gravity loading suit such as weight, gender, and so forth. All such measurements that might be usefully employed in the design or fabrication of a gravity loading suit are intended to fall within the scope of this disclosure.

As shown in step 720, a loading scheme may be identified. In general, a loading scheme aims to apply a desired, simulated load to a body when a suit is in use. Thus, for example, the desired loading may be one G of loading in a zero-gravity environment. Alternatively, one G of loading may be desired when standing on the moon, on Mars, on an asteroid, or in some other gravity environment. The loading scheme may compensate for any decrease in gravitational force below the one G force that a body would experience on Earth. For example, Mars exerts approximately ⅜ of one G of force. A loading scheme may be identified to compensate for the missing ⅝ of one G through the use of the elastic suit. The loading scheme that is identified may also vary over time. When a person is traveling in space the loading scheme may simulate one G of force. Should that person then land on Mars, for instance, the desired loading scheme for net one G of force may decrease to ⅜ of one G of force. In some embodiments, the suit may be adaptable for various loading schemes, such as through the use of adjustable straps, shape metal allows, or any other suitable mechanisms.

In general, the desired loading also implies a required minimum surface pressure in order to suitably resist slipping of the suit when in use, all as discussed in greater detail below. The loading may apply pressure to the feet, legs, and lower torso to simulate a desired loading of gravitational force, and is generally related by the vertical modulus of elasticity within the suit. The surface pressure, on the other hand, is generally related to the circumferential modulus of elasticity of the suit. Thus the surface pressure may be calculated based on the actual (e.g., measured) circumference of the body in a transverse (or other) plane of the body and the corresponding circumference of the suit material in that same plane. Where the transverse plane aligns with the circumferential modulus of elasticity, the surface pressure may be determined directly using the second modulus of elasticity, the circumference around the body in the plane, and the length of the material in the circumferential direction in that same plane. The suit may be designed to provide a surface pressure sufficient for the coefficient of friction of the material against the skin to retain a desired distribution of the suit material about a wearer's body. Thus it will be appreciated that identifying a loading scheme may also include identifying a coefficient of friction (between skin and suit material) adequate to maintain material of the suit in a desired distribution about a wearer's body.

As shown in step 730, the characteristics of an elastic fabric may be determined. This may include determining a first modulus of elasticity, a second modulus of elasticity (in a different orientation within the elastic fabric), and a coefficient of friction between the fabric and a wearer's skin. This may include determining a plurality of characteristics for an elastic fabric based upon fibers used in the material, such as warp and weft fibers or the like. It will be appreciated that the characteristics may be determined at any useful time in the process 700, and may be based upon actual measurements or based upon reported specifications (e.g., from a fabric manufacturer) or historical data for similar fabrics and/or users. It will also be appreciated that, while the following description relates specifically to woven fabrics, this type of elastic material is discussed by way of example and not limitation. Any other suitable material such as any of the elastic materials described above may be suitably adapted to the process 700 without departing from the scope of this disclosure.

As shown in step 740, a distribution of the fabric may be calculated. The process may include calculating a distribution of the elastic fabric to achieve the desired loading scheme. This calculation can also establish or provide as a result a number of circumferential lengths of the elastic fabric to be used in a corresponding suit. The distribution of the elastic fabric is generally constrained by the length of the fabric in the circumferential direction (for surface pressure) and a length in the axial direction (for simulated gravitational loading). A useful mathematical development for such calculations is provided below, although it will be understood that any analytical approach suitable for determining material patterns or dimensions for use in a gravity loading suit may also or instead be employed.

In general, the lateral or circumferential length may be determined based on the desired skin pressure. The hoop tension equation may be used to determine suit pressure:

$$p = \frac{T}{r} \quad (1)$$

where p is the surface pressure, T the circumferential material tension and r the body segment radius. In this case the body segment radius would be for a section of the torso, a section of the leg, or some other body part. As pressure is also equal to normal force divided by area, it is also true that:

$$p = \frac{N}{A} \quad (2)$$

where N is the perpendicular force of the elastic on the skin and A is the area under the elastic. For calculation purposes, the suit is considered to be a contiguous series of stages along the z-axis where the z-axis is in the axial direction of the body. A vertical loading to mimic a normal one G loading regime at a given vertical location may be determined, along with a skin pressure to prevent or inhibit sliding of the suit material over the skin.

For purposes of calculation, the suit may be conceptually divided into individual stages, each of height h. The height h may represent a spacing between circumferential fibers of the material, or any other suitable interval for subsequent calculations. It will be appreciated that smaller values of h may be used to achieve an overall loading that more continuously represents actual gravitational loading, while larger values may be used to simplify calculations for suit design. An area A under each stage may therefore be equal to the local body circumference multiplied by the stage height, or $2\pi rh$. Combining equations 1 and 2 permits a solution for circumferential material tension according to the following equation and associated rearrangements.

$$\frac{N}{A} = \frac{T}{r} \quad (3)$$

$$T = \frac{Nr}{A} = \frac{Nr}{2\pi rh} = \frac{N}{2\pi h}$$

The resistance of a stage to sliding up and down is related to friction forces according to the following equation:

$$F = \mu N \quad (4)$$

F is the net force parallel to the surface, μ is the coefficient of friction between the elastic material and skin, and N is the normal force. For the suit, F represents the axial or vertical force acting on a stage of the suit, and is the difference between loading above and below the stage. F is also the rate of change in the one G loading regime, rather than the absolute loading at a given z-coordinate. The normal force N is the force applied by the material on the skin. The coefficient of friction μ thus relates the skin compression N (required to prevent the stage from slipping) to the force F vertically applied by the stage. This coefficient can be determined, for example, using any standard technique, or may be obtained from historical or manufacturer-supplied data, although it will be appreciated that variations in skin type may result in different coefficients for different users. In one empirical study a coefficient of friction between an elastic material and skin was found to be about 0.55.

Equations 3 and 4 may be combined as:

$$T = \frac{F}{2\mu\pi h} = \frac{F}{1.1\pi h} \qquad (5)$$

By incorporating equation 1 and applying empirical data for a coefficient of friction, a relationship between normal pressure and vertical force may be derived as:

$$p = \frac{F}{1.1r\pi h} \qquad (6)$$

Body segment circumference and average radius may be accurately obtained from on a body by direct measurement at, e.g., 10 mm intervals in vertical height on the torso, thigh, and shank. These values may be used in Equation 6 to determine the skin pressure at various locations (or bands) along the z-axis. Other intervals and values are possible in various embodiments. More generally, any analytical method or other technique suitable for resolving both desired axial loading and appropriate normal pressure for a suit formed of elastic material may be employed without departing from the scope of this disclosure.

As shown in step 750, a pattern for the fabric may be created. The pattern may, for example, be a digital pattern created using the measurements generally described above. In one aspect, a single pattern for the suit may be created from a single sheet of material. Alternatively, numerous small patterns may be created allowing small portions of fabric to be obtained and then stitched or otherwise combined together. In this latter embodiment, each panel may be aligned to obtain a desired orientation of high and low modulus axes for the material. In another aspect, a generic body suit pattern may be provided to provide a general shape for sheets of material. The process may include creating a pattern for one or more panels of the elastic fabric by subtracting or adding material along circumferential paths within the pattern. The pattern may also be smoothed between discrete measurement locations using any suitable technique to avoid discontinuities in the pattern and the resulting suit.

As shown in step 760, a physical pattern may be printed from the digital pattern. The pattern may be a printed paper or other material that can then be overlaid on the elastic fabric before cutting. Alternatively, a pattern may be digitally calculated and directly printed or projected on the fabric for manual cutting. In another aspect, the digital pattern may be applied directly to any suitable computer-controlled hardware to cut the material in the desired shape.

As shown in step 770, the process 700 may include cutting the sheet of elastic fabric according to the pattern. The fabric may be oriented so that, for example, the higher modulus of elasticity is oriented along the axial direction of the body. The fabric may be cut by an automated cutting machine, or the fabric may be cut according to the pattern using shears or some other manual implement.

As shown in step 780, the process may include assembling the one or more panels into the body suit. In general, seams of the fabric, such as individual panels or adjoining edges of a single patterned sheet, may be attached using stitching, adhesives, or any other suitable fastening techniques, as well as any combination of the foregoing. In one aspect, one or more seams may be attached to a zipper or similar mechanism where the suit is intended to be opened and closed repeatedly.

As shown in step 790, the process may include attaching a pair of stirrups to the body suit, typically to the lower portions of the suit, such as near the ankles where openings are provided for feet. The stirrups may be permanently attached to the suit using stitching, adhesive, or the like, or the stirrups may be removably and replaceably attached using Velcro, clasps, snaps, or any other components suitable for detaching and re-attaching stirrups to the suit. The stirrups may be shaped and sized to go around the feet, shoes, or socks of a wearer. Alternatively, the stirrups may attach to shoes or other foot coverings. The stirrups may be formed of any suitable material such as a pliable, non-stretch fabric. Alternatively, the stirrups may include any other pliable or non-pliable and/or stretchable or non-stretchable material consistent with the functions described above and/or user comfort.

As shown in step 792, the process may include attaching a yoke or other shoulder piece to the body suit. The yoke may cover the shoulders and extend to the bottom of the under armpit region of the body. The yoke may be made of inelastic material to define a top, transverse loading plane for elastic material within the suit, as discussed above in greater detail. The yoke may also or instead be formed of elastic material.

As shown in step 794, the process may include attaching a ribbon such as a non-stretch ribbon to the elastic fabric along a side of the suit. The ribbon may be affixed periodically, e.g., at some fixed or variable intervals along the ribbon using stitching, adhesive, or the like. The ribbon may prevent the suit from bunching, and the ribbon may help to preserve a distribution of elastic material about a wearer's body that achieves a desired, simulated vertical loading of the suit (per the calculations described above). Thus, the ribbon can help to maintain the progressively changing load of a simulated gravity loading suit according to the suit's design.

Non-stretch or inelastic ribbon may be attached at any suitable location(s) on the suit. For example, non-stretch ribbon may be attached on the outside of the legs. Non-stretch ribbon may be attached on the inseam of the legs. Non-stretch ribbon may be attached from the ankle region to the under armpit region of the suit. Non-stretch ribbon may be attached from the waist region to the back of the neck line. Non-stretch ribbon may be attached to the suit through the crotch region of the suit.

It will be appreciated that the process 700 described above is provided by way of example only, and that numerous variations are possible. For example, various patterning, cutting, and assembling steps may be performed manually, automatically (with suitable machinery), or some combination of these. Further, the order of steps may be varied, or certain steps may be added, removed, or modified, all without departing from the scope of this disclosure. For example, although not depicted, other assembly steps may be provided such as attaching of one or more zippers to aid in donning and doffing of the suit, or adding grippers or loops to aid in being able to pull on or off the suit. All such variations as would be apparent to one of ordinary skill in the art are intended to fall within the scope of this disclosure.

Figure 8:
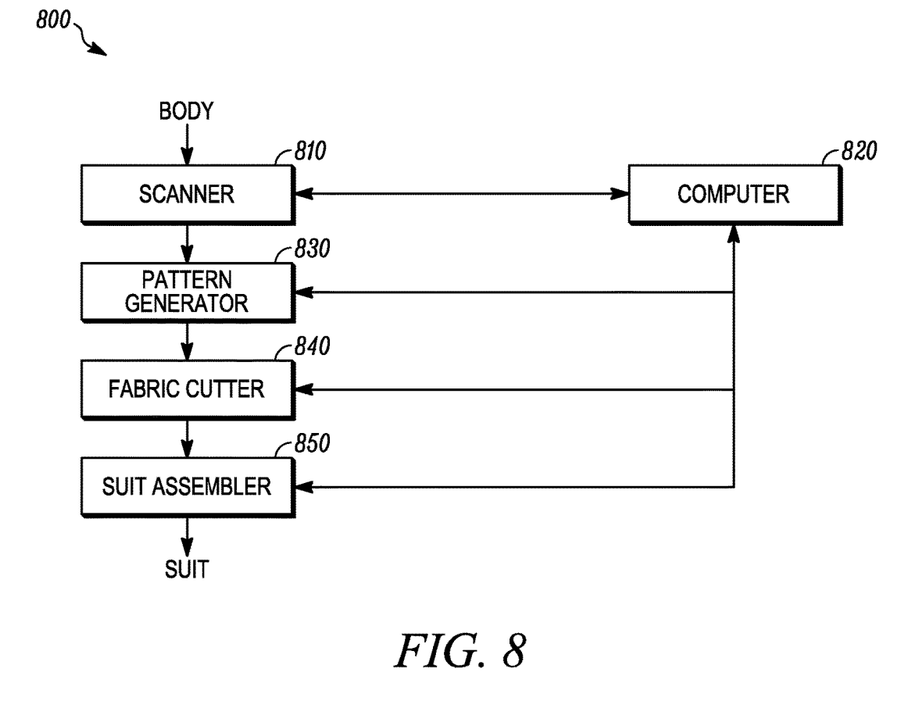
FIG. 8 shows a system for fabricating a suit that simulates gravitational loading.

FIG. 8 shows a system for fabricating a suit that simulates gravitational loading.

The system 800 may include a three-dimensional scanner 810 or any other system for digital acquisition of body dimensions. The scanner 810 may obtain a plurality of measurements from a body using surface scanning techniques such as structured light, time-of-flight, optical (e.g., reconstruction based on conventional two-dimensional images), shape from motion, and so forth. A resulting three-dimensional surface model may be used to derive circumferential or radial measurements for the torso, legs, and so forth for use in the calculations described above. The scanner 810 may also or instead include direct circumferential measurements captured using a meilograph, tape measure, or other automated or manual technique, and or radial measurements derived therefrom. The plurality of measurements may be in digital form, or may be manually captured and entered into a computer or the like for storage and processing. The plurality of measurements may include circumference or radial measurements from the body, which may be captured, for example, at one centimeter vertical intervals, or any other suitable regular or irregular vertical spacing. Data acquisition may also include capture of height, weight, and other bodily dimensions useful in designing a corresponding gravity loading suit. In general, any of these measurements may be derived from three-dimensional scan data, or separately measured using automated or manual techniques.

In general, a computer 820 may include a display, a keyboard, a mouse, a memory for storing measurements, a memory for storing instructions, other memory, a connection to the Internet, other interface capabilities, and the like. The computer 820 may control various aspects of a data acquisition process, such as the vertical interval for circumferential measurements. The computer 820 may control operation of the scanner 810 and may receive other data (e.g., weight, height) that is manually or automatically acquired in a suit design and fabrication process. The computer 820 may also provide data quality analysis to identify potential errors and to suggest or require additional data acquisition. The computer 820 may apply models of expected measurements based on gender, race, age, weight, height, and other factors. The computer 820 may also control other components of the system 800 such as those described below.

A pattern generator 830 may obtain measurements from the scanner 810 or from the computer 820. The pattern generator may retrieve properties of the elastic material used to fabricate the suit. These properties may include information on the two moduli of elasticity as well as the coefficient of friction between the material and skin. The properties of the material may have been previously stored in the computer or pattern generator. The pattern generator 820 may produce a paper pattern or may project a pattern on the fabric or simply generate a digital representation of the pattern needed for the one or more pieces of fabric. Thus it will be appreciated that the pattern may be designed using the computer 820, with a physical instance of the pattern created using the pattern generator 830, which may operate under control of the computer 810 or receive the pattern from the computer 810 and operate autonomously to create the physical instance. As noted above, the output pattern may be a pattern trace printed on a patterning material, a sheet of fabric or the like cut to the shape of the desired pattern, or an optical projection or the like directly onto the suit material for use in cutting according to the desired pattern. More generally, any system for reproducing a digital pattern within the computer 820 in physical form may be suitably employed as the pattern generator 830 without departing from the scope of this invention.

A fabric cutter 840 may obtain the pattern from the pattern generator 830 or the computer 820. The fabric cutter 840 may cut the fabric so that a larger modulus of elasticity is oriented in the axial direction of the body, as described above. More generally, a material having different moduli along different axes may be placed in a desired orientation relative to the pattern before cutting so that an assembled suit exhibits the desired axial and circumferential properties. It will also be appreciated that a variety of non-fabric elastic materials may be suitably used with the suits described herein, and the fabric cutter 840 may usefully handle any such material in the disclosed systems and methods for fabrication of a gravity loading suit. The fabric cutter 840 may receive a single sheet of material, or may receive a continuous feed of material from a roll or the like. It will be readily apparent that the fabric cutter 840 may cut any number of pieces or panels for a suit according to the pattern(s) created by the computer 810.

A suit assembler 850 may take the material which was cut by the fabric cutter 840 and stitch or otherwise assemble the material into a body suit. The suit assembler may perform additional assembly tasks such as attaching one or more zippers, adding strips of inelastic fabric, attaching gripping points, attaching stirrups, attaching a yoke, and so forth. The suit assembler 850 may thus include a variety of separate machines, devices, or tools for separate assembly steps, or the suit assembler 850 may be a single device that integrates any of the assembly steps described herein. In general, suit assembly may be performed manually, automatically, or some combination of these. Where automated suit assembly is performed, the computer 810 may control operation of the suit assembler 850. Where manual assembly is performed, the computer 810 may provide textual and/or diagrammatic instructions for assembly of the suit.

While the foregoing drawings and description set forth functional aspects of the disclosed systems, no particular arrangement of software and/or hardware for implementing these functional aspects should be inferred from these descriptions unless explicitly stated or otherwise clear from the context, and all such arrangements of software and/or hardware are intended to fall within the scope of this disclosure.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In embodiments, disclosed herein are computer program products comprising computer-executable code or computer-usable code that, when executing on one or more computing devices (such as the devices/systems described above), performs any and/or all of the steps described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A garment for therapeutic use by a wearer comprising:
a yoke configured to rest securely about a pair of shoulders of the wearer; and
a suit having a top coupled to the yoke and a bottom distal from the top, the suit shaped and sized to conform to a body of the wearer with sufficient skin pressure to prevent slippage from a desired distribution on the wearer, and the suit including one or more panels of an elastic fabric having a substantially different modulus of elasticity for each of a warp and a weft, the elastic fabric oriented within the suit such that it is configured to provide a dynamic loading for physical therapy that varies according to a position for a limb of the wearer, wherein the warp has a higher modulus of elasticity than the weft, and wherein the weft is configured to be oriented substantially circumferentially around the limb of the wearer.

2. The garment of claim 1 wherein the garment is configured to provide dynamic loading for one or more other limbs of the wearer.

3. The garment of claim 1 wherein the garment is configured to provide dynamic loading for a torso of the wearer.

4. The garment of claim 1 wherein the garment is configured to urge the limb into a desired position by applying a greater force when the limb is out of the desired position.

5. The garment of claim 1 wherein the garment is configured to urge the limb into a desired position by applying a directional force when the limb is out of the desired position.

6. The garment of claim 1 wherein the garment is configured to impose resistance to muscles only when the limb is in a predetermined position.

7. The garment of claim 6 wherein the garment is configured to impose resistance to muscles only when the limb is extended.

8. The garment of claim 1 wherein the elastic fabric is oriented within the suit such that it is configured to provide the dynamic loading for physical therapy that varies according to a position for an arm or a leg of the wearer.

9. The garment of claim 1 wherein the garment is adapted to aid in postural development.

10. The garment of claim 1 wherein the garment is adapted to develop muscles in one or more patterns.

11. The garment of claim 1 wherein the garment is adapted to develop bones in one or more patterns.

12. The garment of claim 1 wherein the garment is adapted to aid in locomotor control.

13. The garment of claim 1 wherein the yoke is formed of an inelastic material.

14. The garment of claim 1 further comprising at least one zipper configured for the garment to open for donning and doffing.

15. The garment of claim 1 further comprising one or more strips of inelastic material secured to the garment at two or more predetermined location.

16. The garment of claim 15 wherein the one or more strips of inelastic material include at least one strip of inelastic material extending from the top of the suit to the bottom of the suit.

17. The garment of claim 1 wherein a first plurality of fibers in the warp each have a substantially greater modulus of elasticity than each of a second plurality of elastic fibers in the weft.

18. The garment of claim 1 wherein the warp has a modulus of elasticity at least ten times greater than the weft.

19. The garment of claim 1 further comprising a pair of stirrups coupled to the bottom of the suit, the pair of stirrups configured to receive a pair of feet of the wearer.

20. The garment of claim 19 wherein each one of the pair of stirrups includes a mechanical coupling for attachment to one or more of a shoe, a vibration therapy device, and an exercise device.

* * * * *